Feb. 12, 1963 D. A. HARTSELL ETAL 3,077,223
APPARATUS FOR FABRICATING HONEYCOMB STRUCTURE
Filed April 28, 1958 5 Sheets-Sheet 5
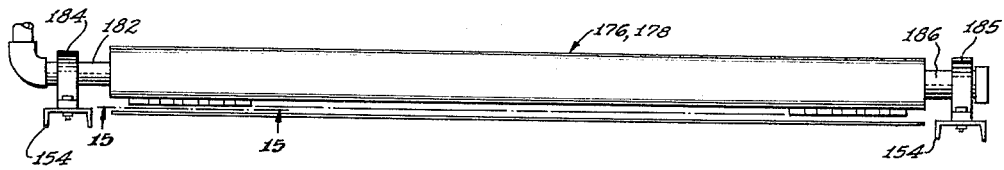
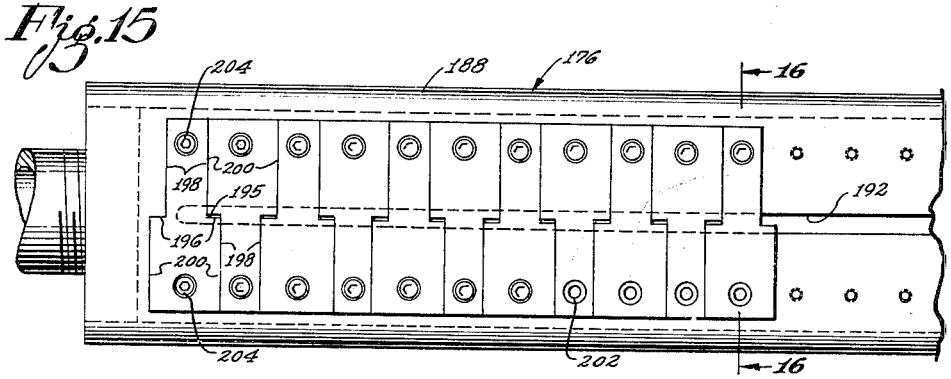
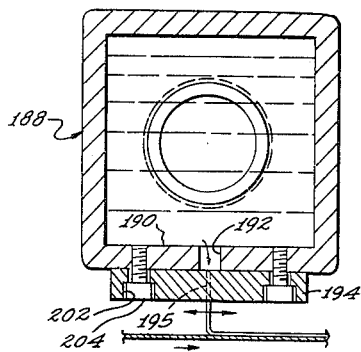
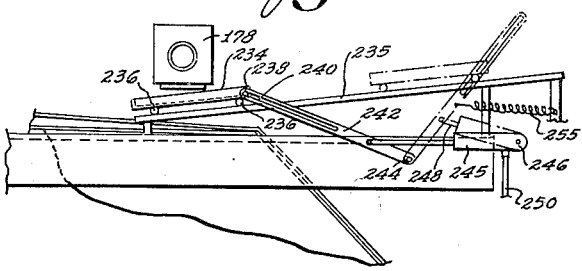
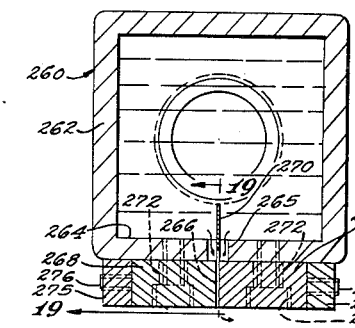
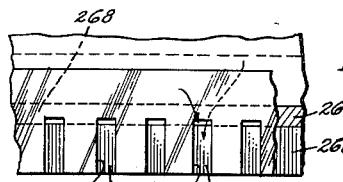
INVENTORS:
Dave A. Hartsell
Anton Sevir
Smyth & Roston
Attorneys

United States Patent Office 3,077,223
Patented Feb. 12, 1963

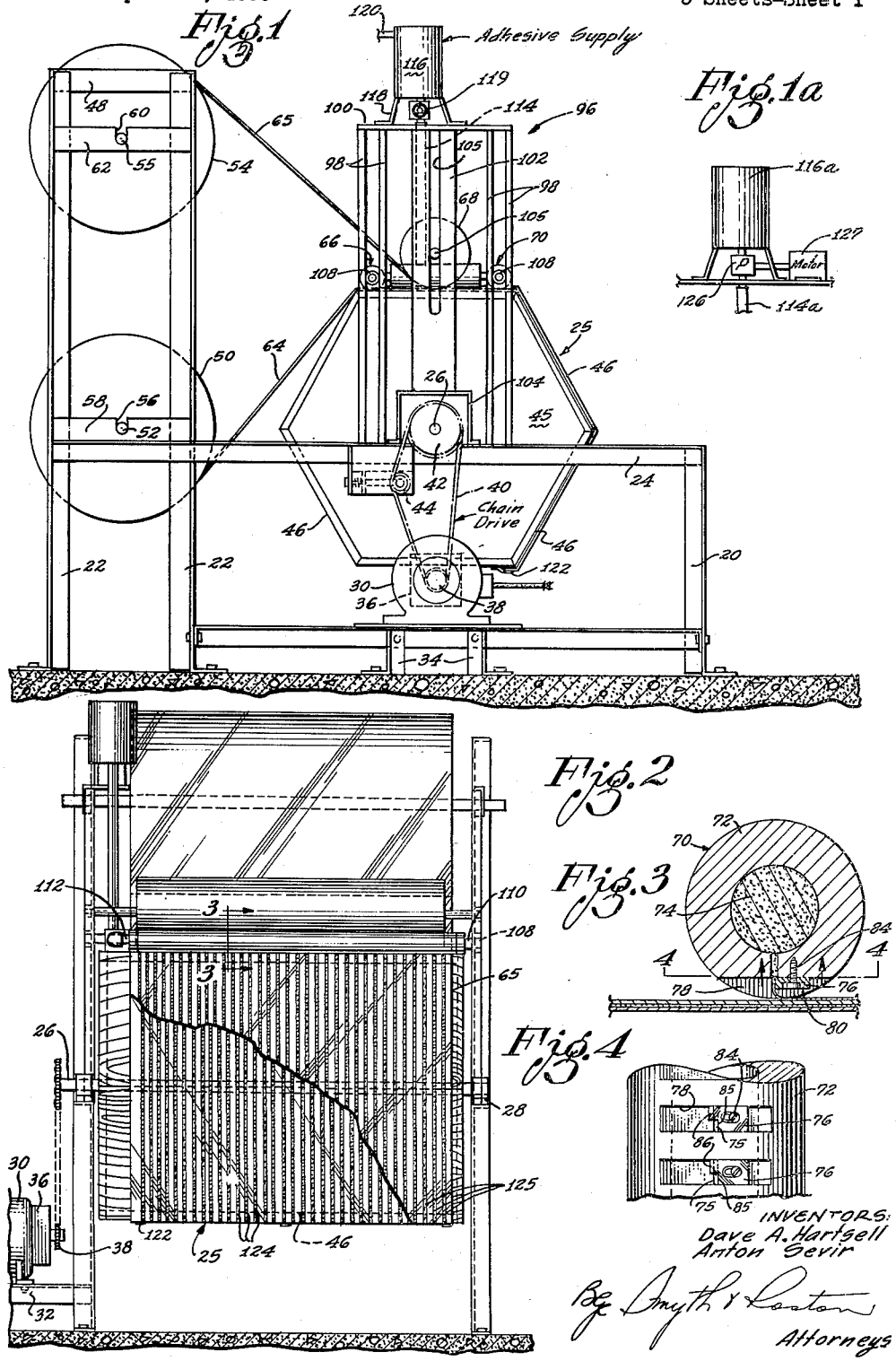

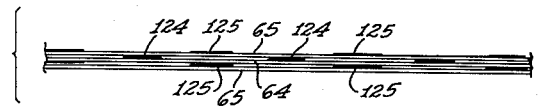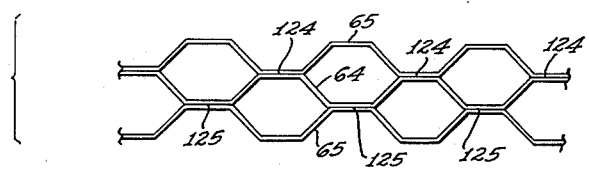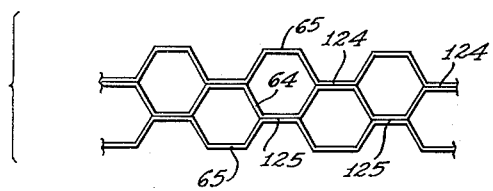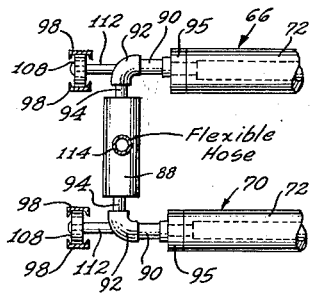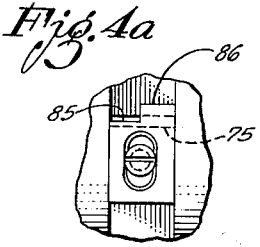

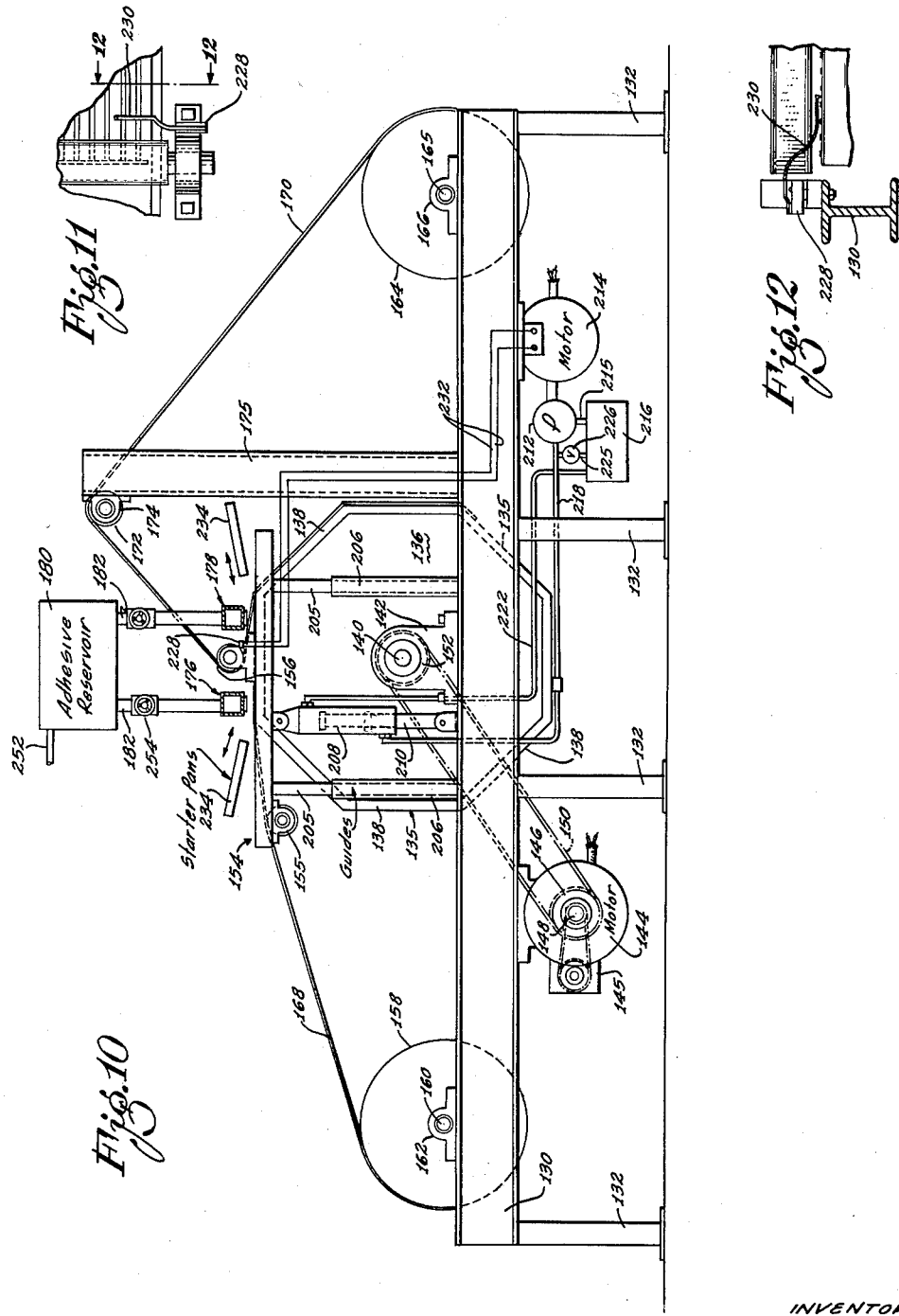

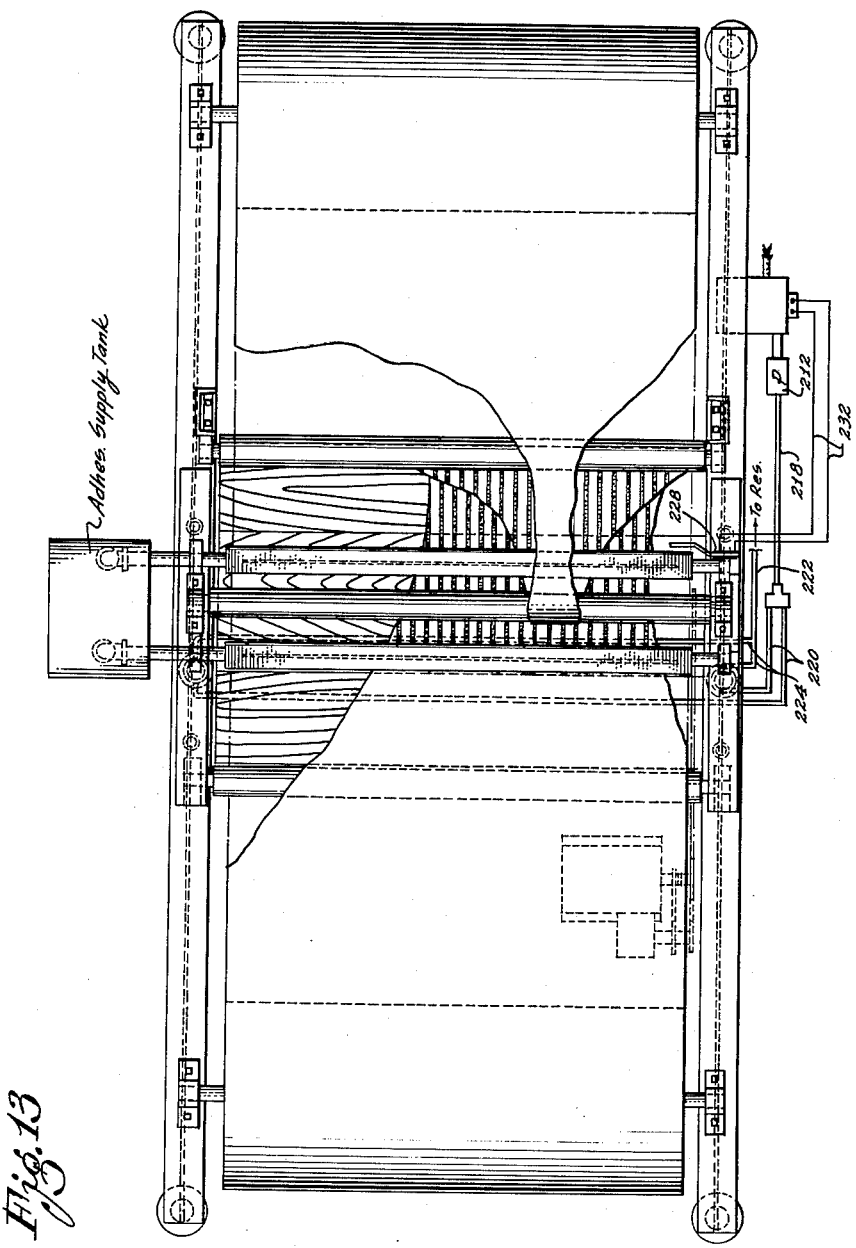

3,077,223
APPARATUS FOR FABRICATING HONEYCOMB STRUCTURE
Dave A. Hartsell, 3903 W. 118th Place, Hawthorne, Calif., and Anton Sevir, 11125 Delrose Ave., Inglewood 2, Calif.
Filed Apr. 28, 1958, Ser. No. 731,291
10 Claims. (Cl. 156—548)

This invention relates to the fabrication of honeycomb core structure. Honeycomb core structure made of relatively light and flexible sheet material such as metal foil or paper may be fabricated by first forming a stack of the sheet material with parallel stripes of adhesive between the successive sheets, each series of stripes being off-set relative to the two adjacent series, and the stripes of alternate series being in register with each other. The stack is then placed under heat and pressure to cure the adhesive. With the successive layers of the stack bonded together in this manner, the stack is sliced transversely of the adhesive stripes into sections as wide as the thickness desired for the honeycomb core. Each of the resultant sections is then expanded to form a honeycomb core.

One prior art method of forming such a stack consists in piling individual sheets of the selected material on each other in sequence and taking time to apply the stripes of adhesive material to each sheet before it is covered by the next sheet. Another prior art process consists in folding a long length of sheet material back and forth on itself and applying the stripes of adhesive to each fold. In these prior art procedures, the adhesive stripes are usually applied by means of applicator rolls.

The present invention is directed to the problem of speeding up the fabrication of such a stack of sheets bonded together by stripes of adhesive, the object being to reduce the fabrication cost and to do so with close accuracy in the positioning of the stripes and with minimum spoilage and waste.

In general, this problem is solved by winding at least two sheets of material simultaneously on a rotary drum of the cross-sectional configuration of a polygon and by simultaneously applying adhesive to the traveling sheets. The periphery of the rotary drum is divided into a circumferential series of flat panels corresponding to the sides of the polygon so that winding the plurality of sheets simultaneously results in a flat stack of layers of the sheet material on each of the flat panels. When a desired number of layers of the sheet material is wound onto the rotary drum, the drum is stopped and the individual flat stacks of the circumferential series of flat stacks are severed from each other. Heat and pressure are applied to the stacks to cure the adhesive and then the flat stacks are sliced into sections for expansion in the usual manner.

A feature of the preferred practice of the invention is the concept of pouring accurately controlled streams of the adhesive onto the traveling sheets to provide the required stripes of adhesive. One problem is to achieve the desired accurate control of these streams. In one practice of the invention, this problem is solved by a nozzle assembly incorporating individual adjustment members in the form of slidably mounted plate members that may be shifted by exceedingly small increments to restrict the streams of adhesive to various degrees. In another practice, interchangeable shim plates are used in the nozzle assembly, each shim plate providing accurate adjustment of all of the nozzle apertures simultaneously.

Another problem is to locate the adhesive stripes accurately so that in the resulting stacks the adhesive stripes on alternate layers of the sheet material are in exact registration, the stripes of the successive layers being staggered as required for the fabrication of a honeycomb core. This problem is met by fixing the position of each nozzle assembly relative to the corresponding traveling sheet in a region where the position of the traveling sheet relative to the rotary drum is fixed by wrapping engagement of the sheet with the drum. By virtue of such an arrangement, the stripes of adhesive take positions on the drum that correspond exactly to the positions of the nozzle assemblies relative to the drum. Thus, with the nozzle passages of the nozzle in correctly staggered relationship, the wound stripes of adhesive on the drum are correctly staggered, the adhesive stripes of alternate layers being in precise registration.

With reference to the application of the adhesive to the traveling sheet by simply pouring the adhesive onto the traveling sheet, a further feature of the preferred practice of the invention is the provision of what may be termed starter trays. These starter trays may be shifted temporarily from normal retracted positions to positions for intercepting and collecting the streams of adhesive. The provision of such starter trays makes it possible to collect the adhesive for an initial period to permit the streams of adhesive to become stabilized and uniform before starting the winding operation. This procedure insures correct deposition of the adhesive material from the very beginning of an operating cycle and thus eliminates initial wastage.

Another feature of the preferred practice of the invention is maintenance of constant vertical spatial relationships between the nozzle assemblies and the traveling sheets as the layers of sheet material build up on the rotary drum. In one practice of the invention, this objective is achieved by supporting the nozzle assemblies on the accumulated layers on the rotary drum so that the nozzle assemblies are automatically elevated progressively as the number of layers on the rotary drum progressively increases. In another practice of the invention, the nozzle assemblies are elevated by power means controlled by means adjacent the periphery of the rotary drum that senses or detects progressive accumulation of layers on the drum. The power means may be a fluid-pressure-actuated means such as a hydraulic power means and the sensing means may be a suitable switch actuated by contact with the wrapped material on the rotary drum.

The various features and advantages of the invention may be understood from the following detailed description in conjunction with the accompanying drawings.

In the drawings, which are to be regarded as merely illustrative:

FIG. 1 is a side elevation of a relatively simple apparatus that may be used for one practice of the invention, the apparatus being idle but prepared to initiate an operating cycle;

FIG. 1a is a side elevational view showing how a positive displacement pump can be used for the liquid adhesive;

FIG. 2 is a front elevation of the same apparatus under operation with portions of one of the sheets broken away;

FIG. 3 is a transverse section on an enlarged scale of a nozzle assembly that is employed in this embodiment of the invention, the section being taken along the line 3—3 of FIG. 2;

FIG. 4 is a fragmentary bottom view of the nozzle assembly as seen along the line 4—4 of FIG. 3;

FIG. 4a is a fragmentary bottom plan view on an enlarge scale of an adjustment plate member employed in the nozzle assembly;

FIG. 5 is a fragmentary plan view showing how the ends of the two nozzle assemblies are interconnected by a manifold that supplies the fluid adhesive;

FIG. 6 is an end view of three successive layers of the sheet material with the layers spaced apart to show the positions of the stripes of adhesive material thereon;

FIG. 7 is a similar view with the three layers pressed together to be interbonded by the adhesive material;

FIG. 8 shows the shapes of the three sheets at an intermediate point in the operation of expanding a sliced section of a finished stack;

FIG. 9 shows the shapes of the three sheets when the expansion operation is completed to form the finished honeycomb core;

FIG. 10 is a side elevation partly in section of another form of apparatus that may be employed in a second practice of the invention;

FIG. 11 is a fragmentary plan view on an enlarged scale showing how a sensing switch is positioned for contact with the wrapped material on the rotary drum for control of hydraulic power means to support the nozzle assemblies in constant relationship to the wrapped material;

FIG. 12 is a fragmentary sectional view taken as indicated by the line 12—12 of FIG. 11 showing how the actuating arm of the sensing switch is positioned relative to the traveling material;

FIG. 13 is a plan view of the apparatus shown in FIG. 10 with portions of the traveling sheet material broken away;

FIG. 14 is a front elevation of one of the nozzle assemblies on an enlarged scale;

FIG. 15 is a fragmentary bottom view of the nozzle assembly on a greatly enlarged scale as seen along the line 15—15 of FIG. 14;

FIG. 16 is a transverse-sectional view of the nozzle assembly along the line 16—16 of FIG. 15;

FIG. 17 is a diagrammatic view showing the construction of a mechanism that may be employed to shift a starter tray temporarily from a normal retracted position to an extended position under a nozzle assembly to intercept the streams of adhesive;

FIG. 18 is a transverse-sectional view of a nozzle assembly that may be substituted for the nozzle assembly shown in FIGS. 15 and 16; and FIG. 19 is a greatly enlarged sectional view taken as indicated by the line 19—19 of FIG. 18 and showing in side elevation a replaceable shim plate for adjusting all of the nozzle apertures of the assembly simultaneously.

The moving parts of the apparatus of the first embodiment of the invention shown in FIGS. 1-5 are supported by a frame of angle iron members which includes a pair of forward legs 20, two pairs of rearward upright members 22 and an upper pair of parallel horizontal support members 24. A rotary drum, generally designated 25, is mounted on a driven shaft 26 which is journaled in suitable bearings 28 on the horizontal support members 24.

The rotary drum 25 is actuated by a suitable motor 30 which is mounted on a pair of lower support members 32 (FIG. 2) which extend laterally from the main frame and are supported at their outer end by short legs 34 (FIG. 1). The motor is operatively connected to reduction gearing in a gear case 36 for actuation of a drive sprocket 38 at reduced speed. The drive sprocket 38 is connected by a sprocket chain 40 with a driven sprocket 42 on the drive shaft 26, the sprocket chain being engaged by a tensioning idler 44 in a well-known manner.

The rotary drum 25 may be of any suitable construction of the cross-sectional configuration of a polygon. In this instance, the rotary drum 25 has the cross-sectional configuration of a hexagon and has a circumferential series of six flat panels which correspond to the six sides of the hexagon. The rotary drum may have end walls 45 of ½″ steel plate and the periphery of the drum may comprise six panels 46 made of plywood.

Each of the two pairs of upright members 22 of the frame of the apparatus may be interconnected at their upper ends by members 48 and may be adapted in any suitable manner to support and journal rolls of sheet material suitable for fabricating the honeycomb core. The sheet material may comprise, for example, aluminum foil of a .0007″ thickness or may comprise thicker foil, for example foil of .0065″.

As best shown in FIG. 1, a lower roll 50 of the sheet material is mounted on an axle 52 and an upper roll 54 of the sheet material is mounted on an upper axle 55. The lower axle 52 is journaled in recesses 56 in plates 58, each of the two plates 58 bridging one of the pairs of the upright members 22. In like manner, the upper axle 55 is journaled in recesses 60 in the upper plates 62.

The lower sheet 64 from the lower roll 50 is led to the periphery of the rotary drum 25 to be wound thereon and the upper sheet 65 from the upper roll 54 is led to the periphery of the rotary drum to be wound thereon, with the upper sheet superimposed on the lower sheet 64. In this particular practice of the invention, the lower sheet 64 passes under a transverse nozzle assembly 66 for application of the stripes of adhesive material thereon. The sheet 65 from the upper roll 54 passes under a heavy roll 68 which serves as a weight to press the two sheets together and then the two sheets pass under a second nozzle assembly 70 that deposits the stripes of adhesive material on the second sheet.

The nozzle assembly 70 may be of the construction shown in FIGS. 3 and 4 and the nozzle assembly 66 may be of the same construction. As shown in these two figures, the nozzle assembly 70 comprises a feed tube 72 which is filled with the fluid adhesive material 74. The feed tube 72 has a spaced series of downwardly extending flow passages 75 which as indicated in FIG. 4 are of narrow rectangular cross-sectional configuration. Each of the flow passages 75 is partially restricted by a corresponding plate member 76 which is adjustably mounted on the underside of the feed tube. In the construction shown, a side slot 78 is cut on the underside of the feed tube. In the construction shown, a guide slot 78 is cut on the underside of the feed tube 72 in the region of each of the flow passages 75, and each of the plate members 76 is slidingly confined by the corresponding side slot. Each of the plate members 76 has a countersunk slot 80 for engagement by a round head screw 84. Each of the screws 84 may be loosened for a range of adjustment of the corresponding plate member that is provided by the corresponding slot 80.

As best shown in FIG. 4a, preferably each of the plate members 76 is of off-set configuration at its end to provide an edge 85 that extends partially across the corresponding flow passage 75 and to form a tongue 86 that extends all the way across a portion of the flow passage. Thus, the width of the stream of adhesive material that issues from the flow passage is narrowed in width by the tongue 86 but is constant in width over the range of adjustments of the plate member, the thickness of the stream being determined by the position of the edge 85.

As best shown in FIG. 5, the two nozzle assemblies 66 and 70 may be rigidly interconnected at one end by means including a box-like manifold 88. In the construction shown, the two nozzle assemblies 66 and 70 are connected by nipples 90 to pipe elbows 92 and the two pipe elbows, in turn, are connected by nipples 94 respectively to the opposite ends of the manifold 88.

Each of the nozzle assemblies is provided with a pair of spaced coaxial rollers 95 that rest on the opposite longitudinal margins of the traveling sheet material to support the nozzle assembly. Thus, each nozzle assembly maintains constant elevation relative to the traveling sheet material and is elevated progressively as the layers of sheet material progressively accumulate on the rotary drum 25.

Any suitable arrangement may be provided to guide the two nozzle assemblies 66 and 70 in their upward movement as they are raised by the accumulation of layers of sheet material on the rotary drum. In the present embodiment of the invention the required guide means is provided by an auxiliary frame, generally designated 96. The auxiliary frame 96 comprises four pairs of upright channel-shaped tracks 98, the bottom ends of the tracks resting on the previously mentioned horizontal frame members 24 and the upper ends of the tracks being interconnected by a horizontal top plate 100. The auxiliary frame 96 also includes upright plates 102 on its opposite sides, the lower ends of which are supported by corresponding brackets 104. These brackets 104 straddle the corresponding bearings 28 for the driven shaft 26. The two upright plates 102 serve to guide the heavy roll 68, and for this purpose each of the upright plates has a vertical guide slot 105 which slidingly engages a corresponding trunnion 106 on the end of the heavy roll.

Each of the nozzle assemblies 66 and 70 is provided with a pair of guide rollers 108 at its opposite ends, each of the guide rollers riding in a pair of the vertical tracks 98. For this purpose, one end of each of the nozzle assemblies 66 and 70 is provided with a trunnion 110 (FIG. 2) on which one of the guide rollers 108 is journaled, and the other end is provided with a second trunnion 112 (FIG. 5), the trunnion 112 being mounted directly on a corresponding pipe elbow 92.

Any suitable arrangement may be provided to supply liquid adhesive to the manifold 88. In this instance, the manifold 88 is connected by a flexible supply hose 114 to an upper adhesive reservoir 116 that is mounted by legs 118 on the top plate 100 of the auxiliary frame. Preferably the hose 114 is provided with a shut-off valve 119. It is apparent that with the two nozzle assemblies 66 and 70 resting by their rollers 95 on the wrapped material on the rotary drum 25, the two nozzle assemblies will be repeatedly raised and lowered because of the hexagonal configuration of the drum and, in addition, will be progressively elevated by the accommulation of layers of sheet material on the drum. Consequently, the manifold 88 will be repeatedly rocked lengthwise by the two nozzle assemblies and, in addition, will be progressively elevated. The flexibility of the supply hose 114 permits the required rocking movement of the manifold as well as the progressive elevation of the manifold.

In the preferred practice of the invention, the adhesive in the two nozzle assemblies 66 and 70 is maintained under fluid pressure so that the rate of flow of the adhesive material through each of the nozzle passages 75 is determined not only by the extent to which the flow passage is restricted but also by the fluid pressure. To provide the required fluid pressure, the adhesive reservoir 116 is of closed construction and is connected to a source of compressed air by an air pipe 120.

The manner in which this first embodiment of the invention operates for its purpose may be readily understood from the foregoing description. To initiate a wrapping cycle, the leading edges of the two sheets 64 and 65 from the two supply rolls 50 and 54 are anchored to the periphery of the rotary drum 25 by a retainer means 122. The retainer means 122 may comprise simply a thin strip of suitable material, which strip is attached temporarily to the rotary drum in a suitable manner. The valve 119 is then opened to permit the pressurized liquid adhesive from the reservoir 116 to flow through the flexible hose 114 and the manifold 88 to the two nozzle assemblies 66 and 70 for discharge from the two series of nozzle passages 75. When steady flow is established at the nozzle passages 75, the motor 30 is energized to initiate rotation of the hexagonal drum 25.

As the lower traveling sheet 64 passes under the first nozzle assembly 66, the nozzle assembly discharges spaced streams of adhesive onto the traveling sheet to form stripes of adhesive 124 as shown in FIG. 2. Immediately after the stripes of adhesive are deposited, the lower traveling sheet 64 makes contact with the upper traveling sheet 65 under the heavy roll 68, the heavy roll pressing the two sheets together. The two traveling sheets with the stripes of adhesive 124 therebetween now pass under the second nozzle assembly 70 which deposits adhesive to form stripes 125 on the upper sheet. As shown in FIG. 2, the stripes 125 are off-set halfway between the stripes 124. All of the stripes 124 on the alternate wrapped layers register with each other, and the adhesive stripes 125 on the other layers register with each other.

The accurate positioning of the stripes 124 and the stripes 125 with all the sets of stripes 124 registering, and with all the sets of stripes 125 registering, is accomplished by pouring the adhesive material onto the two traveling sheets 64 and 65 in the regions where the positions of the traveling sheets relative to the rotary drum are fixed by wrapping engagement of the sheets with the drum. Thus, as may be seen in FIG. 1, the nozzle assembly 66 is located in a region where the position of the sheet 64 with respect to lateral shift of the sheet is fixed by wrapping engagement of the sheet with the rotary drum. In like manner, it is obvious that the second nozzle assembly 70 is positioned where the position of the second sheet 65 with respect to lateral shift of the sheet is fixed relative to the rotating drum.

The thickness of the deposits of a liquid adhesive of a given viscosity to form the stripes of adhesive will not only depend on the fluid pressure of the adhesive and the cross-sectional dimension of the nozzle passages 75, but will also depend on the circumferential dimension of the rotary drum 25 and the rate of rotation of the drum. In a typical practice of the invention, the adhesive used is commercially designated as FM-47 and is manufactured by the Bloomingdale Rubber Company of Chester, Pennsylvania. 16 grams of this adhesive is applied per square foot of the adhesive stripes. The adhesive is maintained under a pressure of 50 p.s.i., and the nozzle passages 75 are restricted to a thickness of .005". The rotary drum 25 is dimensioned to provide six panels 46, each panel being 12" wide by 36" long. The drum rotates at approximately 4½ r.p.m.

When the sheet material has been wrapped onto the rotary drum 25 to the desired total thickness, the drum is stopped and the valve 119 is closed to cut off the flow of adhesive. The wrapped material on the drum is then cut into six stacks corresponding to the six panels 46 of the drum. Each of the severed stacks is then subjected to heat and pressure in a well known manner to cure the stripes of adhesive material. Each of the stacks is then sliced transversely of the adhesive stripes to divide the stack into sections and then each of the sections is expanded to form the desired honeycomb core.

The manner in which the desired honeycomb structure results from the procedure may be understood by reference to FIGS. 6, 7, 8 and 9. FIG. 6 shows how the sheets 64 and 65 are separately coated with the stripes of adhesive material 124 and 125 as the sheets approach the periphery of the rotary drum 25. FIG. 7 shows the same sheets pressed together in preparation for the curing of the adhesive. FIG. 8 shows how the corresponding layers behave when a sliced section of a cured stack of sheets is partially expanded; and FIG. 9 shows the same sheets at the full expansion that results in the final honeycomb core configuration.

It is apparent that one important advantage of the invention is that the apparatus is of simple and inexpensive construction. Another important advantage is that the apparatus requires only a fraction of the floor space of prior art devices of the type that operate on the principle of folding the sheet material instead of wrapping the sheet material on a rotary drum. A third and important advantage is that since the drum rotates continuously throughout the operating cycle, the apparatus is inherently capable of a greater rate of production than is possible with an apparatus that folds the sheet material to and fro to form the multiple layered stacks.

FIG. 1a shows how the adhesive may be supplied to the nozzle assemblies by a positive displacement pump for close accurate control of the rate of flow from the nozzle passages. A positive displacement pump 126 driven by a variable speed motor 127 draws the adhesive from a reservoir 116a and discharges into a flexible hose 114a corresponding to the previously mentioned flexible hose 114.

In the second embodiment of the invention shown in FIGS. 10–17, the moving parts of the apparatus are supported by a frame that includes a pair of longitudinal I-beams 130 supported by a plurality of legs 132. A rotary drum 135 is employed having heavy end plates 136, the rotary drum being of octagonal configuration with a circumferential series of eight flat peripheral panels 138. The rotary drum 135 is mounted on a driven shaft 140 that is journaled at its opposite ends in bearings 142. The driven shaft 140 is actuated by a motor 144 which is connected to gearing in a gear case 145, the gearing in turn being connected to a sprocket 146 that is rotatably mounted on the motor shaft 148. The sprocket 146 is connected by a drive chain 150 to a sprocket 152 on one end of the driven shaft 140.

Positioned immediately above the rotary drum 135 is an open rectangular frame, generally designated 154, which may be aptly termed an elevator frame since the frame is elevated progressively in response to progressive accumulation of wrapped layers of the sheet material on the rotary drum. The elevator frames 154 carry a lower guide roller 155 for sheet material and also an upper guide roller 156 for the same purpose. At one end of the apparatus frame is a supply roll 158 of sheet material mounted on an axle 160 that is journaled in suitable bearings 162. Mounted on the other end of the frame of the apparatus is a second supply roll 164 of sheet material on an axle 165 that is journaled in bearings 166.

A first sheet 168 from the first supply roll 158 passes over the lower guide roll 155 into wrapped engagement with rotary drum 135. A second sheet 170 from the second supply roll 164 passes over an overhead guide roll 172 and then down around the guide roller 156 into wrapped engagement with the rotary drum 135. The overhead guide roll 172 is journaled by means of trunnions in a pair of bearings 174 that are mounted on corresponding stanchions 175 of the frame.

Suitably supported on the elevator frame 154 in positions to clear the rotating wrapped drum are two transverse nozzle assemblies 176 and 178 together with an overhead adhesive reservoir 180 that is connected to the two nozzle assemblies by a pair of supply pipes 182. As best shown in FIG. 14, one end of each of the two nozzle assemblies 176 and 178 may be mounted on the elevator frame 154 by a bracket 184 engaging the corresponding supply pipe 182. The other end of each nozzle assembly may mounted on the elevator frame in a similar manner by a bracket 185 engaging a capped nipple 186.

Each of the nozzle assemblies 176 and 178 may be of the adjustable construction illustrated by FIGS. 15 and 16, wherein each assembly comprises a feed tube 188 of rectangular cross-sectional configuration having a flat bottom wall 190. The bottom wall 190 is formed with a longitudinal slot 192 and this slot is spanned by a series of adjustable plates 194 which form a series of adjustable nozzle passages 195. Each of the plates 194, which is dimensioned and shaped with extreme accuracy, is formed of off-set configuration to provide a pair of shoulders 196 and the successive plates in the series of plates are oppositely turned so that the shoulders 196 of the successive plates cooperate to form the nozzle passages 195. It can be seen in FIG. 16 that each of the plate 194 is T-shaped in plan, the stem of the T providing a pair of parallel edges 198 and the head of T providing a pair of parallel edges 200. The accurately ground edges 198 abut the accurately ground edges 200 in a fluid-tight manner at the junctures of the successive plates with the cooperating shoulders 196 spaced apart to give the nozzle passages 195 the desired cross-sectional dimension. Each of the plates 194 is adjustably mounted on the underside of the bottom wall 190. For this purpose, each of the plates 194 is formed with two oversize countersunk bores 202 through which headed screws 204 extend into threaded engagement with the bottom wall 190. It is apparent that the two headed screws 204 may be loosened for adjustment of an individual plate 194 and that the plates may be adjusted in sequence to give the nozzle passages 195 the desired dimensions in cross section.

Any suitable arrangement may be provided to support the elevator frame 154 and to lift the elevator frame progressively in response to the accumulation of layers of sheet material on the rotary drum 135. In the construction shown, the elevator frame 154 is provided with four downwardly extending guide legs at its four corners and these guide legs slidingly telescope into upright guide tubes 206 that are fixedly mounted on the two I-beams 130. The opposite ends of the elevator frame 154 are supported by a pair of hydraulic cylinders 208 having corresponding pistons with piston rods 210, the cylinders being connected to the elevator frame and the piston rods being connected to the respective I-beams 130.

The lifting action of the two hydraulic cylinders 208 is accomplished by a pump 212 that is driven by a motor 214. The intake side of the pump 212 is connected by a pipe 215 with an oil reservoir 216, and the discharge side of the pump is connected to a pipe 218 having 2-branches 220 that are connected respectively to the lower ends of the two hydraulic cylinders 208. A return pipe 222 having 2-branches 224 to the upper ends of the two hydraulic cylinders, respectively, carries hydraulic fluid back to the reservoir 216.

To permit oil to be released from the lower ends of the two hydraulic cylinders 208 for lowering of the elevator frame 154, the high pressure pipe 218 is connected to the oil reservoir 216 by a short pipe 225 that is equipped with a suitable shut-off valve 226. By virtue of this arrangement, the pump 212 may be energized by the motor 214 to pump oil from the reservoir 216 into the bottom ends of the two hydraulic cylinders 208 to lift the elevator frame 154 and, with the pump 212 energized, the shut-off valve 226 may be opened to release oil from the lower ends to the two hydraulic cylinders for lowering of the elevator frame 154.

The height of the elevator frame 154 during the wrapping cycle is controlled by a suitable sensing switch 228 having a feeler arm 230, the switch being normally closed and being opened in response to upward pressure on the feeler arm. The sensing switch 228 is in the circuit of the motor 214 and is connected to the motor by a pair of wires 232. As shown in FIGS. 11 and 12, the sensing switch 228 is mounted on one of the I-beams 130 with the feeler arm 230 extending over the wrapped rotary drum 135, the outer end of the feeler arm being turned downward to touch the wrapped sheet material between two of the stripes of adhesive thereon. It is apparent that the accumulated increase in the number of layers of sheet material wrapped on the rotary drum 135 causes the sensing switch 228 to be closed for intermittent energization of the motor 214 to cause the elevator frame 154 to maintain a constant elevation with reference to the wrapped sheet material on the rotary drum.

As heretofore indicated, a feature of the second embodiment of the invention is the provision of a pair of starter trays 234 which are shown diagrammatically in their normal retracted positions in FIG. 10. As shown in FIG. 17, each of the starter trays 234 may be mounted at its opposite ends on inclined rails 235 by means of small rollers 236. In the construction shown, each end of a starter tray 234 is provided with a lug or pin 238 that extends in a sliding manner into a longitudinal slot 240 of an arm 242 that is pivotally mounted on a fixed pivot 244. Each of the two arms 242 is controlled by a pneumatic power cylinder 245 that is mounted on a pivot 246. A piston rod 248 extending from the pivoted power cylinder 245 is pivotally connected to the arm 242 at an intermediate point thereof. The pneumatic power cylinder 245 is supplied with compressed air by an air pipe 250 under suitable valve control.

In preparation for a wrapping cycle and prior to initiating rotation of the rotary drum 135, the adhesive reservoir 180 is placed under fluid pressure by a pipe 252 from a compressed air source and a pair of shut-off valves 254 in the pair of supply pipes 182 are opened to supply the adhesive under pressure to the two nozzle assemblies 176 and 178. Just before the adhesive starts to flow from the two nozzle assemblies, the pneumatic power cylinders 245 are energized to extend the two starter trays 234 from their normal retracted positions to their alternate positions at which they intercept the adhesive flowing from the two sets of nozzle passages 195. FIG. 17 shows in dotted lines the retracted position of a starter tray 234 and shows in solid lines the position of the starter tray under the corresponding nozzle assembly to intercept the adhesive from the nozzle passages 195 and to collect the adhesive in a manner to keep the adhesive from reaching the surface of the paper on the stationary rotary drum.

When the flow of the liquid adhesive from the series of nozzle passages 195 is stabilized, the motor 144 is energized to start the wrapping operation and simultaneously the pneumatic power cylinder 245 are de-energized for return of the starter trays 234 to their retracted positions, the return movements of the trays being accomplished by suitable coil springs 255 attached to the arms 242 respectively. The operating cycle is then carried out in the previously described manner with the two nozzle assemblies depositing staggered series of stripes of adhesive on the alternating sheets that are wrapped around the rotary drum 135.

FIGS. 18 and 19 show the construction of a nozzle assembly, generally designated 260, that may be substituted for any of the previously described nozzle assemblies. The nozzle assembly 260 comprises a feed tube 262 of square cross-sectional configuration having a bottom wall 264 with a longitudinal slot 265 for feeding the liquid adhesive to a series of spaced nozzle passages 266.

A pair of longitudinal bars 268 is mounted on the underside of the bottom wall 264 on opposite sides of the slot 265 to cooperate with each other for clamping in position what may be termed a nozzle shim 270 that extends upward through the slot. The two longitudinal bars 268 have countersunk bores 272 to receive socket-head screws 274, the countersunk bores being oversize to permit adjustment of the longitudinal bars. To place the longitudinal bars 268 under clamping pressure, the two longitudinal bars are flanked by a pair of outer bars 275 that are rigidly attached to the underside of the feed tube 262. Suitable transverse set screws 276 extend through the outer bars 275 into abutment against the longitudinal bars 268. This arrangement permits the screws 274 to be loosened for slight loosening of the longitudinal bars 268 so that the set screws 276 may be tightened against the longitudinal bars to cause the longitudinal bars to grip the nozzle shim 270 with the desired effectiveness.

The nozzle shim 270 is formed with spaced slots 278 that extend upward from its lower edge as best shown in FIG. 19. These slots 278 cooperated with the adjacent surfaces of the longitudinal bars 268 to form the previously mentioned nozzle passages 266. As may be seen in FIGS. 18 and 19, the upper ends of the shim slots 278 extend into the feed tube slot 265 above the level of the longitudinal bars 268 to form the inlet ends of the nozzle passages 266. Thus, the liquid adhesive flows into the longitudinal slot 265 of the feed tube and then into the shim slots 278 as indicated by the arrows in FIGS. 18 and 19.

It is contemplated that the nozzle shim 270 will be one of a series of nozzle shims of graduated thickness that are interchangeable in the nozzle assembly 260. Thus a nozzle shim of one thickness may be substituted for a nozzle shim of a different thickness to provide nozzle passages of different effective cross-sectional dimensions. It will be readily appreciated that the nozzle shim 270 may be dimensioned with close accuracy to provide exceedingly accurately dimensioned nozzle passages 266. An outstanding advantage of this arrangement is that the two longitudinal bars 268 may be quickly tightened against the nozzle shim 270 along the length of the nozzle shim to provide nozzle passages of the desired accuracy in cross-sectional dimension, all of the nozzle passages being adjusted to predetermined dimensions simultaneously.

Our description of the selected practices of the invention will suggest various changes, substitutions and other departures from our disclosure within the spirit and scope of the appended claims.

We claim:

1. In an apparatus for the fabrication of a honeycomb structure, the combination of: a power-actuated rotary drum of the cross-sectional configuration of a polygon with a circumferential series of flat peripheral surfaces corresponding to the sides of the polygon; means to feed a first sheet of material to the drum to be wound thereon; a first series of spaced nozzle passages extending across the width of the drum in fixed relation to the axis of the drum to deposit adhesive on said first sheet during the winding thereof to form spaced stripes of adhesive on the traveling sheet; means to feed a second sheet of material to the drum to be wound thereon over the first sheet to be bonded thereto by said stripes of adhesive; a second series of spaced nozzle passages extending across the width of the drum in fixed relation to the axis of the drum to deposit adhesive on said second sheet during the winding thereof to form spaced stripes of adhesive on the traveling sheet in staggered relation to the stripes of adhesive on said first sheet, each of said series of nozzle passages being positioned in the region of the corresponding traveling sheet where the position of the sheet relative to the width of the drum is fixed by the wrapping engagement of the sheet with the drum whereby the resulting stripes of adhesive on the wound layers are in radial alignment with the nozzle passages with resulting registration of the stripes of adhesive on the alternate sheets.

2. An apparatus as set forth in claim 1 which includes means to shift said nozzle passages progressively outward relative to the periphery of said drum in response to progressive increase in the number of wound layers of the sheet material on the drum.

3. A combination as set forth in claim 2 in which said nozzle passages are provided by nozzle assemblies that rest on the wound sheet material on the rotary drum to be supported thereby and to be raised progressively by progressive increase in the number of layers of sheet material wound on the drum.

4. An apparatus as set forth in claim 2 which includes means to sense the increase in the number of layers of sheet material on the drum; and which includes power means controlled by said sensing means to shift the nozzle passages outward relative to the drum.

5. An apparatus as set forth in claim 4 in which said sensing means comprises a normally open switch adjacent the periphery of the drum for mechanical actuation by the wound sheet material on the drum.

6. A combination as set forth in claim 1 which includes rotary pressure means resting on the wound sheet material on the drum to cooperate with the periphery of the drum to press the layers of wound sheet material together.

7. An apparatus as set forth in claim 1 in which each of said series of nozzle passages is formed by a series of members in adjustable sliding contact with each other, each of said members having two spaced surfaces forming portions of two successive passages of the series of passages whereby said members may be adjusted relative to each other in sequence to adjust the cross-sectional areas of the passages in sequence.

8. An apparatus as set forth in claim 1 which includes starter trays for each of said series of nozzle passages, each of said starter trays being movable from a retracted position to a position to intercept the adhesive material flowing from the nozzle passages.

9. An apparatus as set forth in claim 8 which includes means to shift said starter trays between their two positions by remote control.

10. An apparatus as set forth in claim 1 which includes positive displacement pump means to supply liquid adhesive to said nozzle passages under pressure and which includes means to variably restrict the flow from the nozzle passages.

References Cited in the file of this patent
UNITED STATES PATENTS

| | | |
|---|---|---|
| 765,412 | Budwig | July 19, 1904 |
| 1,225,242 | Guerin | May 8, 1917 |
| 2,130,629 | Clayton | Sept. 20, 1938 |
| 2,527,752 | May | Oct. 31, 1950 |
| 2,569,755 | Griffith | Oct. 2, 1951 |
| 2,734,842 | Frink et al. | Feb. 14, 1956 |
| 2,734,843 | Steele | Feb. 14, 1956 |
| 2,784,134 | Ross | Mar. 5, 1957 |